Nov. 5, 1968    A. H. MEITZLER ET AL    3,409,848
ELASTIC SURFACE WAVEGUIDE
Filed Oct. 30, 1967    3 Sheets-Sheet 1

INVENTORS: A. H. MEITZLER
H. F. TIERSTEN
BY
Lyman Sherman
ATTORNEY $\Delta f = U/2\pi R$ 3,409,848
ELASTIC SURFACE WAVEGUIDE
Allen H. Meitzler, Morristown, and Harry F. Tiersten, West Orange, N.J., assignors to Bell Telephone Laboratories, Incorporated, Murray Hill, N.J., a corporation of New York
Filed Oct. 30, 1967, Ser. No. 678,892
9 Claims. (Cl. 333—71)

ABSTRACT OF THE DISCLOSURE

This application discloses a structure for guiding elastic surface waves comprising a guiding slot within an elastic surface wave supporting layered structure. In particular, the layered structure comprises a relatively thick surface wave supporting substrate upon which there is disposed a relatively thin layer of a material whose propagation parameters are so related to those of the substrate that the surface wave phase velocity of the layered structure is increased. The guiding slot comprises a longitudinally extending slot which is sufficiently deep to penetrate the thin layer and expose the underlying substrate. These guiding structures eliminate beam spreading and can be readily adapted to form a variety of elastic wave circuit devices, including filters, power dividers and directional couplers.

---

This invention relates to elastic surface-wave guiding structures.

Background of the invention

Elastic wave devices are used in a variety of applications. One of the better known uses is in delay lines to provide delay or storage of signal pulses in certain radar systems, computer memories and switching systems. In addition, the relatively recent development of elastic wave circuit devices such as amplifiers, modulators, detectors and filters opens up the possibility that certain circuit functions, which are relatively difficult or expensive to perform electronically, can be carried out acoustically.

A typical elastic wave delay line comprises a body of elastic wave supporting medium having transducers located at opposite ends of an elastic wavepath in the body. In operation, an electrical signal is applied to a first transducer which then launches a bulk-mode elastic wave into the body. The wave propagates along the wavepath to the second transducer and is converted to an electrical signal.

Prior art delay lines, however, are subject to a number of significant limitations. One such limitation is the well-known problem of beam spreading. A second problem is the difficulty and expense of producing bulk-mode elastic wave circuit devices. Typically, the critical dimensions of such devices are as small as, or smaller than, the wavelength of the elastic energy being acted upon. Because bulk-mode circuit devices are typically machined to final dimensions, the fabrication of devices intended to operate at very small wavelengths is both tedious and expensive.

In the copending application of H. Seidel and D. L. White, assigned to applicants' assignee and filed concurrently with the present application, there are shown elastic waveguides adapted to overcome the aforementioned limitations. Among the waveguides shown is an elastic surface waveguide comprising a guiding strip of low velocity material, such as gold, disposed upon a higher velocity substrate, such as fused quartz. This guiding structure has significant advantages over those used in the prior art in that it substantially eliminates beam spreading and in that it can be easily fabricated in a variety of configurations by relatively inexpensive photo-etching processes.

Summary of the invention

The present invention represents an alternative elastic surface wave guiding structure comprising an elastic wave supporting substrate having a guiding slot disposed therein. More specifically, it has been discovered that the surface wave phase velocity of a wave supporting substrate can be increased by a thin layer of an appropriate material disposed thereupon. In addition, it has been discovered that a slot penetrating the thin layer to expose the substrate guides elastic surface waves along the slot.

Detailed description of the drawing

Figure 1:
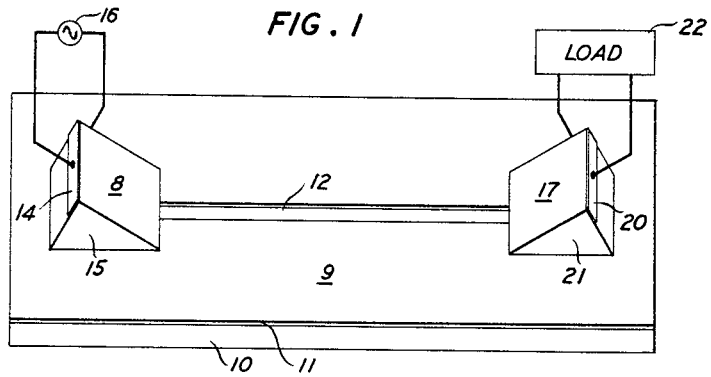
FIG. 1 shows a schematic illustration of an elastic surface wave guiding structure according to the invention.

FIG. 1 is a schematic illustration of an elastic surface wave guiding structure in accordance with the invention comprising a layer of appropriate material 11 disposed upon an elastic surface-wave supporting substrate 10 to form a layered substrate having an increased surface-wave phase velocity—hereinafter referred to as a layered substrate—with a slot 12 penetrating thin layer 11 to guide elastic surface waves. Surface-wave transducers 9 and 15 for launching and receiving elastic surface waves, respectively, are coupled to opposite ends of guiding slot 12.

Substrate 10 can be any material which is capable of supporting elastic waves and has uniform elastic properties in at least one transverse direction. Advantageously, the substrate material is low-loss for elastic waves and is elastically isotropic.

Layer 11 is a layer of material adapted to increase the surface-wave velocity of the composite structure. It can be shown that any layer of material having propagation parameters bearing a certain relationship to those of the substrate increases the surface-wave phase velocity. In particular, an appropriate layer of material is one in which the quantity $$F(q) = \left\{ -\left(\frac{V_R}{V_{S'}}\right)^2 \left(\sqrt{1-\left(\frac{V_R}{V_D}\right)^2} + \sqrt{1-\left(\frac{V_R}{V_S}\right)^2}\right) + 4\left[1-\left(\frac{V_{S'}}{V_{R'}}\right)^2\right] \sqrt{1-\left(\frac{V_R}{V_S}\right)^2} \right\}$$

is positive, where:

$V_R$ is the phase velocity of a Rayleigh surface wave for the substrate;
$V_S$ is the phase velocity of a shear wave in the substrate;
$V_D$ is the phase velocity of a dilational wave in the substrate;
$V_{S'}$ is the phase velocity of a shear wave in the layer; and
$V_{D'}$ is the phase velocity of dilational wave in the layer.

An example of a pair of materials which meet these conditions is aluminum on a zero temperature coefficient glass substrate such as is described in U.S. Patent No. 3,154,425, granted to H. L. Hoover on Oct. 27, 1964.

Surface wave transducers 9 and 15 can be any one of a number of well-known arrangements. As an example, the surface wave transducers shown each comprise a bulk-mode transducer 14 (and 20) bonded to a wedge-shaped member 15 (and 21) as is described in detail in U.S. Patent No. 3,289,114, granted to J. H. Rowen on Nov. 29, 1966. A signal source 16 is provided to apply an electrical signal to input transducer 9, and a load is applied between the terminals of output transducer 15. Alternate arrangements for producing surface waves, together with a mathematical analysis of surface waves (also called Rayleigh waves), may be found in the following publications:

"Surface Waves at Ultrasonic Frequencies," by E. G. Cook and H. E. Van Valkenburg, ASTM Bulletin, May 1954, pp. 81–84;

"Inspection of Metals with Ultrasonic Surface Waves," by Willard C. Minton, Nondestructive Testing, July–August 1954, pp. 13–16; and "Investigation of Methods for Exciting Rayleigh Waves," by I. A. Viktorov, Soviet Physics-Acoustics, vol. 7, No. 3, January–March 1962, pp. 236–244.

Guiding slot 12 comprises a region of substrate 10 where layer 11 has been removed, as by photoetching, for example. Advantageously, layer 11 is selectively removed; however, the slot can penetrate into substrate 10 to a depth which is less than a few wavelengths. The slot is coupled to input and output transducers 9 and 15, and extends between them.

Figure 2:
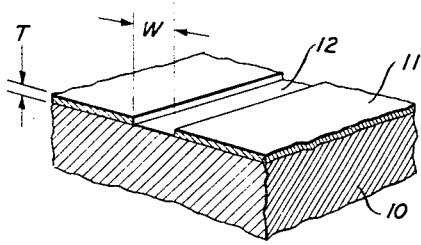
FIG. 2 shows a cross section of a guiding slot used in the guiding structure of FIG. 1.

FIG. 2 shows a perspective view of a typical guiding structure. Layer 11 is shown as a thin layer of uniform thickness, T, disposed upon a smooth surface of substrate 10. Guiding slot 12 comprises a region of substrate 10, of width W, where layer 11 has been selectively removed. In general, the thickness, T, and the width, W, can be chosen to suppress higher order modes and minimize dispersion. More specifically, higher order modes are suppressed by making T so small that the lowest antisymmetric mode is no longer guided. This means that T is much less than a wavelength of elastic wave energy at the operating frequency, i.e., typically less than 10 percent of the wavelength. Dispersion, on the other hand, can be minimized by choosing the optimum value for the width-to-thickness ratio. In general, such an optimum value exists for a band of frequencies centered at a given frequency F and can be determined empirically and/or theoretically. Specifically, the optimum ratio is that ratio which produces a maximum in the curve of the dimensionless phase velocity, $V_R/V_S$, as a function of the dimensionless propagation constant, $2\pi T/L$, where T is the thickness and L is the elastic wavelength, at frequency F. Typical curves for a guiding structure comprising aluminum on zero temperature coefficient glass are shown in FIG. 3B.

Figure 3A:
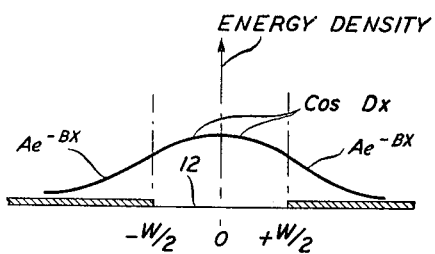
FIGS. 3A and 3B are graphical illustrations useful in understanding the invention.
Figure 3B:
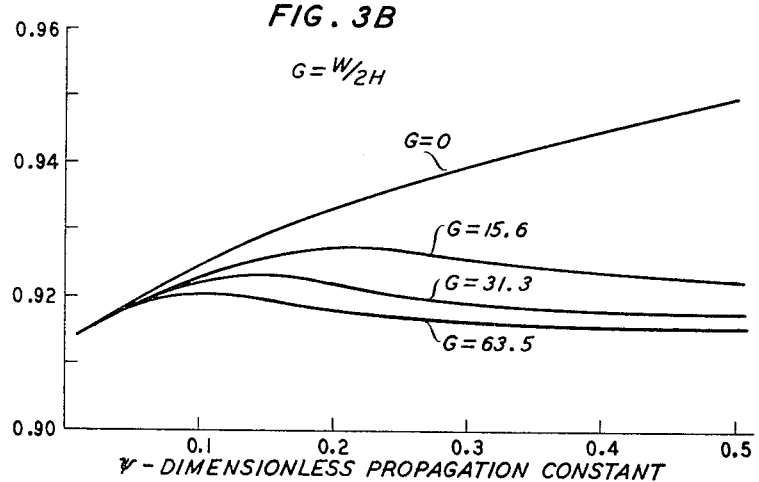

FIG. 3A shows the distribution of first order mode energy over the surface of a typical slot guiding structure of the type described above. The guiding slot 12 is shown on the same scale for ease of reference. The curve has the form $Ae^{-Bx}$ outside the slot, and $C \cos Dx$ inside it. In these expressions, A and C are constants describing the amplitude of the motion and B and D are related to both the plated and unplated free surface wave phase velocity, $V_R$ and $\overline{V}_R$, the guided surface wave velocity U, and the wavelength L, by the formula, $$B = \frac{2\pi}{L}\left[\frac{V_R^2 - U^2}{V_R^2}\right]^{1/2}$$

$$D = \frac{2\pi}{L}\left[\frac{U^2 - \overline{V}_R^2}{\overline{V}_R^2}\right]^{1/2}$$

It should be particularly noted that most of the elastic wave energy is located in the slot. Since the slot consists of unplated substrate, rather than a relatively lossy plated region, a slot surface waveguide typically has a lower loss per unit length than a strip surface waveguide. It should also be noted that a portion of the energy is distributed over a portion of the substrate just outside the guiding slot. This phenomenon permits the design of coupling devices. In particular, by controlling the shape of the guiding slot, or by placing a plurality of slots close together so that they interact with one another, a variety of different elastic surface wave devices can be devised, as will be shown hereinbelow.

Figure 4A:
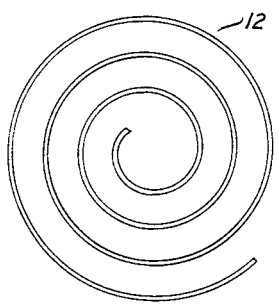
FIGS. 4A, 4B, and 4C illustrate elastic wave delay lines.
Figure 4B:
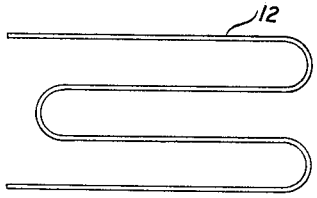
Figure 4C:
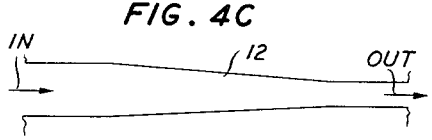

The guiding structure of FIG. 1 can be used as elastic wave delay lines, convenient forms of which are illustrated in FIGS. 4A and 4B. In particular, FIG. 4A shows a delay line in which the guiding region 12 is formed in a spiral for compactness. (In general, guiding structures in accordance with the invention can be curved so long as the radius of curvature is large compared to a wavelength.) FIG. 4B shows an alternate configuration in which the guiding region is folded. These delay lines have a number of advantages over those used in the prior art. One particularly significant advantage is that lines having very high Q's can be formed since there is insignificant loss of energy due to beam spreading. A second advantage is their low loss per unit length. A third advantage is that they can be made to have low dispersion.

In addition, these surface wave delay lines can be made on substrates by inexpensive processes as, for example, photoresist techniques.

Figure 5:
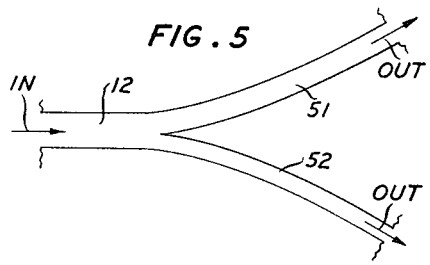
FIG. 5 shows an illustrative embodiment of an elastic surface wave power divider.

Because these surface wave guiding structures can be made economically and with great precision, and because closely spaced adjacent structures couple energy between them, a wide variety of practical surface wave circuit devices are feasible. FIG. 5, for example, illustrates a guiding slot configuration useful as a power divider. As illustrated, the power divider comprises a main guiding slot 12 which divides into two branch slots 51 and 52. The transition into the branches is advantageously smooth and gradual in order to prevent reflection and mode conversion. In general the branch slots do not have the same width so as to permit unequal power division. Thus, branch slot 51 is shown to have a greater width than branch 52.

Elastic wave energy propagating down main slot 12 divides and flows into each of the two branch slots. In general the power divides in a ratio which depends upon the location of the dividing point with respect to the center of slot 12. More specifically, that portion of the energy in the energy distribution which is to the right of the dividing point flows into the right-hand branch slot 51 and that portion which is to the left flows into the left branch 52. Since the division illustrated is to the right of center, less power flows into the right branch 51 than into the left branch.

Figure 6:
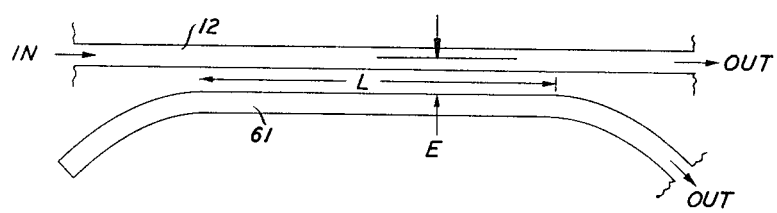
FIG. 6 shows an illustrative embodiment of an elastic wave directional coupler.

FIG. 6 illustrates an example of a guiding slot configuration for producing directional coupling. The coupling arrangement comprises a main guiding slot 12 and a secondary slot 61 which passes sufficiently close to slot 12 over a sufficiently long distance to couple a predetermined proportion of the energy from a slot 12 to slot 61.

In particular, the distance between the two slots over the coupling interval is such that relatively weak coupling is produced, thus avoiding a significant impedance mismatch in slot 12. A rough criterion for this distance is obtained by considering the energy distribution of FIG. 2. For these purposes, weak coupling can be said to exist if less than ten percent of the energy normally associated with slot 12 is included in the region extending outward from the near edge of slot 61. This corresponds to values of E, the distance from the center of slot 12 to the near edge of slot 61, of less than $3/2B$, where B is as defined in the description of FIG. 3B.

The length L of the coupling region over which the two slots coextend can be chosen to divide the power between them in any desired ratio. The fraction of the energy that is coupled per wavelength is approximately equal to the fraction of the energy that extends beyond the near edge of slot 61.

A tapped delay line can be produced by placing a plurality of couplers adjacent to a delay line at certain specified intervals. This results in a delay line which has many outputs, each output having a different delay.

Figure 7A:
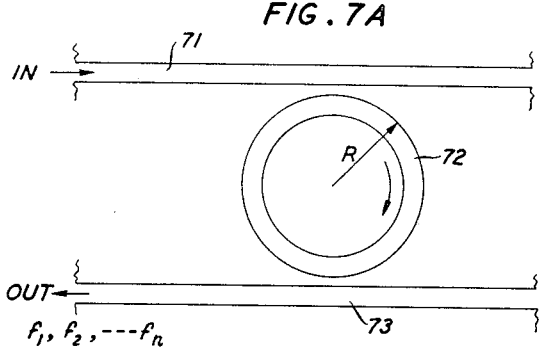
FIG. 7A illustrates a resonant elastic wave device.
Figure 7B:
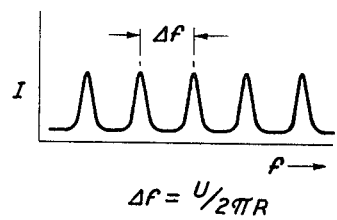
FIG. 7B, included for purposes of illustration, shows the spacing of the resonant frequencies.

Coupling can also be frequency selective, as illustrated in the resonant coupling arrangement of FIG. 7A. In particular, FIG. 7A shows a resonant coupler comprising a first guiding slot 71, a second slot in the form of a closed loop 72, weakly coupled to first slot 71, and a third slot 73 weakly coupled to loop 72. In general, loop 72 is resonant whenever the loop circumference is equal to an integral multiple of the elastic wavelength. Energy at these resonant frequencies builds up in the loop and, in turn, is coupled into slot 73. In the particular example illustrated in FIG. 7A, the loop is a circle of radius R. Thus, coupling occurs for a plurality of signal components at frequencies $f_1, f_2 \ldots$ spaced apart an increment $\Delta f = U/2\pi R$, where U is the guided surface wave velocity.

Figure 8A:
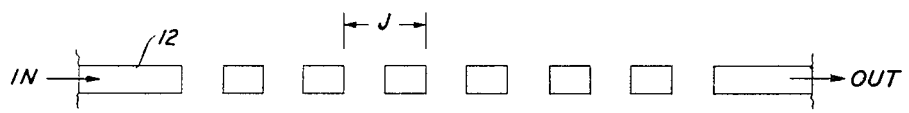
FIGS. 8A and 8B illustrate two elastic wave filters.
Figure 8B:
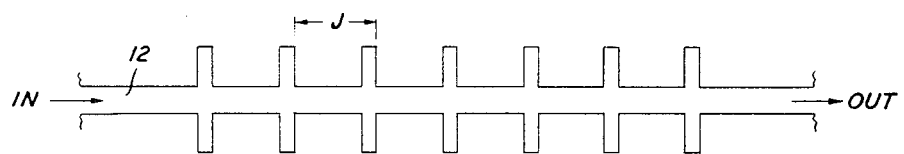
Figure 8C:
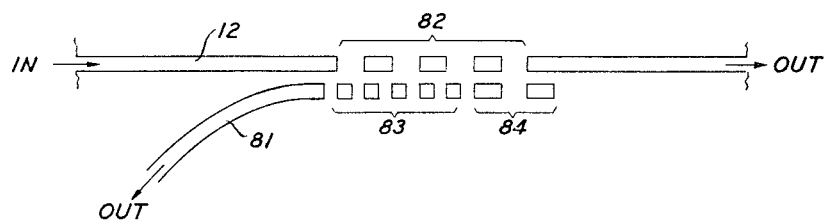
FIG. 8C illustrates a frequency sensitive elastic wave coupling device.

FIGS. 8A, 8B and 8C illustrate examples of elastic wave filters in accordance with the invention. In general, if a guiding slot is disturbed at regularly spaced intervals, such as by periodic discontinuities along the strip, band-limiting properties are produced. FIG. 8A shows a filter configuration comprising a guiding slot 12 into which portions of layer 11 are included at regular intervals, J. In general, such a structure tends to have a transmission minimum at frequency $U/2J$ and a maximum at frequency $U/4J$, where U is the velocity of the guided wave. However, either one of these effects can be selectively emphasized by controlling the number of periodic discontinuities. In particular, when the number of discontinuities is small (for example, less than 10), the structure acts primarily as a band-rejection filter centered at frequency $U/2J$. On the other hand, when the number of discontinuities is large (for example, greater than 50), the structure acts primarily as a bandpass filter centered at frequency $U/4J$.

An alternative filter structure having similar properties can be produced by periodically expanding the slot. FIG. 8B illustrates such a structure in which the slot is expanded by periodically increasing its width.

FIG. 8C shows a frequency sensitive coupler which combines the features of the above-described filter arrangements with those of a directional coupler to produce an arrangement which couples only a preselected frequency. In this arrangement, a slot 81 is weakly coupled to a main guiding slot 12 over a coupling interval that is sufficiently long to produce complete transfer of energy from slot 12 to slot 81. In addition, the coupling interval along slot 12 comprises a band-rejection filter 82 centered at frequency f, while the coupling interval along slot 81 comprises a bandpass filter 83. Advantageously, slot 81 is terminated at one end by a section of band-rejection filter 84.

In operation, the out-of-band portion of a broadband signal propagating along slot 12 is transmitted past band-rejection filter 82, while that portion of the wave energy centered about frequency f is coupled onto slot 81. Filter 84 serves the useful function of reflecting any coupled energy centered about frequency f which tends to propagate in the wrong direction. Because filter 83 is a bandpass filter for energy centered around frequency f, little out-of-band energy is coupled onto the strip 81.

Figure 9:
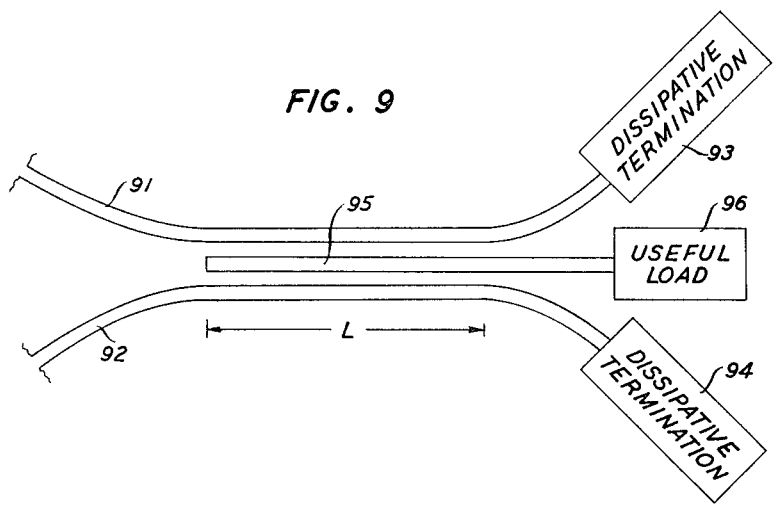
FIG. 9 shows an illustrative embodiment of an elastic wave logic device.

FIG. 9 illustrates a guiding slot configuration which can be used to perform certain logic functions acoustically. In this figure there is shown a pair of guiding slots 91 and 92, each having a dissipative termination, 93 and 94, such as an indium dot, at one end. Each of the slots is weakly coupled to a third slot 95 over a coupling region of length L. Slot 95 is, in turn, coupled to a useful load 96.

In operation, various logic functions can be performed by the controlled transfer of energy among these slots.

The configuration is used as an "exclusive OR" gate by taking advantage of the fact that when pulses are on both slots 91 and 92, each pulse is coupled to slot 95 in one-half the distance required for coupling when a pulse is on only one of the two slots. More specifically, the length L of the coupling interval is chosen such that when a pulse is traveling down only one of the two slots 91 or 92, the pulse energy is completely transferred to slot 95. Thus, a pulse on only one slot produces an output pulse at the load. However, if there are pulses on both slots 91 and 92, a complete transfer of energy is accomplished in a distance $L/2$. Thus, during travel down the first half of the interval L, the energy is coupled from slots 91 and 92 to slot 95. However, over the second half of the interval it is transferred back from slot 95 to slot 91 and 92, producing no output pulse at load 96.

On the other hand, the configuration can be used as an "AND" gate by increasing the length of the coupling region by about 50 percent to a length $3/2L$. In this case, when there is a pulse on only one of the slots 91 or 92, the energy is first coupled from the one slot to slot 95 over a coupling interval L. The energy is then coupled back to both slots 91 and 92, with half going to each, over the remaining interval $L/2$. Thus, no output is produced at load 96. However, when pulses are present on both slots 91 and 92, the distance required for complete transfer from each slot to slot 95 is halved and the pulse is again transferred back to slot 95. In particular, both pulses are transferred to slot 95 in the first interval $L/2$; they are transferred back to slots 91 and 92 in the second interval $L/2$; and they are again transferred to slot 95 in the last interval $L/2$. Thus an output pulse is produced at the useful load.

In all cases, the above-described arrangements are merely illustrative of a small number of the many possible specific embodiments which can represent applications of the principles of the invention. Thus numerous and varied other arrangements can be readily devised in accordance with these principles by those skilled in the art without departing from the spirit and scope of the invention.

What is claimed is:

1. A structure for guiding a wave containing an elastic surface wave comprising:
    a body of an elastic wave supporting medium having at least one smooth surface characterized by uniform elastic properties in a transverse direction;
    a thin layer of material disposed upon said surface for increasing the elastic surface wave phase velocity of said surface;
    a longitudinally extending slot penetrating said thin layer for guiding an elastic surface wave;
    means for coupling elastic surface wave energy into and out of said guiding slot.

2. A structure for guiding an elastic surface wave comprising:
    a body of an elastic wave supporting medium having a smooth surface characterized by uniform elastic properties in a transverse direction;
    a thin layer disposed upon said surface of a material whose propagation parameters are so related to those of said supporting medium as to increase the surface wave phase velocity of said surface;
    a longitudinally extending slot for guiding an elastic surface wave penetrating said thin layer;
    and means for coupling elastic surface wave energy into and out of said structure.

3. A guiding structure according to claim 2 wherein:
    the thickness of said thin layer is much less than the wavelength of the highest frequency elastic surface wave to be propagated.

4. A guiding structure according to claim 2 wherein:
    the thickness of said thin layer is less than 10 percent of the wavelength of the highest frequency elastic surface wave to be propagated.

5. An elastic surface wave power divider comprising a guiding structure according to claim 2 wherein:
said guiding slot divides into a plurality of branch guiding slots.

6. An elastic surface wave directional coupler comprising:
an elastic surface wave supporting layered substrate;
a pair of surface wave guiding slots within said layered substrate weakly coupled together over an interval;
and means for coupling surface wave energy into a first of said pair of slots and out of the second of said pair.

7. An elastic surface wave resonant structure comprising:
an elastic surface wave supporting layered substrate;
a pair of elastic surface wave guiding slots within said substrate;
a third surface wave guiding slot in the form of a closed loop within said substrate and weakly coupled to each slot of said pair;
and means for coupling elastic surface wave energy into and out of said structure.

8. An elastic surface wave filter comprising a guiding structure according to claim 2 having:
a plurality of discontinuities extending over a portion of the guiding slot length.

9. An elastic surface wave logic device comprising:
an elastic surface wave supporting layered substrate;
a pair of elastic surface wave guiding slots within said layered substrate, each having a dissipative termination at one end;
a third surface wave guiding slot weakly coupled to each of said pair of guiding slots over an interval;
means for coupling elastic surface wave energy into each of said pair of guiding slots;
and means for coupling elastic surface wave energy out of said third guiding slot.

References Cited

UNITED STATES PATENTS 3,289,114  11/1966  Rowen _____ 333—30

OTHER REFERENCES

Einspruch: "IEEE Spectrum," March 1966, pp. 116–124.

ROY LAKE, *Primary Examiner.*

D. R. HOSTETTER, *Assistant Examiner.*